US006607062B1

(12) United States Patent
Heatwole et al.

(10) Patent No.: US 6,607,062 B1
(45) Date of Patent: Aug. 19, 2003

(54) PISTON ASSEMBLY FOR HYDRAULICALLY ACTUATED FRICTION COUPLING

(75) Inventors: Gregory L. Heatwole, Fort Wayne, IN (US); Kevin J. Knight, Fort Wayne, IN (US); Jeremy J. Wudy, Fort Wayne, IN (US)

(73) Assignee: Torque Traction Technologies, Inc., Holland, OH (US)

( * ) Notice: Subject to any disclaimer, the term of this patent is extended or adjusted under 35 U.S.C. 154(b) by 0 days.

(21) Appl. No.: 10/076,437

(22) Filed: Feb. 19, 2002

(51) Int. Cl.[7] .............................................. F16D 25/02
(52) U.S. Cl. ..................... 192/85 AA; 475/88
(58) Field of Search ........................ 192/85 AA, 3.52, 192/57, 35; 475/86, 88

(56) References Cited

U.S. PATENT DOCUMENTS

| 3,157,057 A | * | 11/1964 | Palmer et al. ................ 74/378 |
| 3,435,936 A | * | 4/1969 | Warman ................... 192/113.1 |
| 4,450,943 A | * | 5/1984 | Long, Jr. ................... 192/70.2 |
| 4,635,778 A | * | 1/1987 | Lederman .............. 192/85 AA |
| 5,310,388 A | | 5/1994 | Okcuoglu et al. |
| 5,439,083 A | * | 8/1995 | Brock et al. ................ 192/70.2 |
| 5,706,923 A | | 1/1998 | Gassmann |
| 5,709,627 A | | 1/1998 | Teraoka |
| 5,827,145 A | | 10/1998 | Okcuoglu |
| 5,893,445 A | * | 4/1999 | Dover ................... 192/85 AA |
| 6,039,160 A | * | 3/2000 | Joppeck ..................... 192/52.5 |
| 6,056,658 A | | 5/2000 | Illmeier |
| 6,209,695 B1 | * | 4/2001 | Braford, Jr. ................ 192/3.58 |
| 6,296,095 B1 | * | 10/2001 | Bottger et al. ................ 192/35 |

* cited by examiner

Primary Examiner—Saul Rodriguez
(74) Attorney, Agent, or Firm—Liniak, Berenato & White

(57) ABSTRACT

A hydraulically actuated friction coupling comprises a hollow case, an output shaft drivingly connected to the case, a friction clutch pack for selectively engaging and disengaging the case and the output shaft, and a hydraulic clutch actuator. The hydraulic actuator includes a hydraulic pump for generating a hydraulic pressure to frictionally load the clutch pack, and a piston assembly disposed within the case between the pump and the clutch pack. The piston assembly includes an annular pressure plate adjacent to the pump, an annular thrust plate axially spaced from the pressure plate and adjacent to the clutch pack, and a pair of concentric radially spaced resilient annular seal members bonded to the pressure and thrust plates so as to define an annular cavity within the piston assembly. The annular cavity in the piston assembly is in fluid communication with an output port of the hydraulic pump.

20 Claims, 3 Drawing Sheets

PISTON ASSEMBLY FOR HYDRAULICALLY ACTUATED FRICTION COUPLING

BACKGROUND OF THE INVENTION

1. Field of the Invention

The present invention relates to a hydraulic clutch actuator for a torque-coupling device, such as a speed sensitive limited slip differential for use with a vehicle drive train, and more particularly to a piston member of the hydraulic clutch actuator.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces, is well known.

A number of devices have been developed to limit wheel slippage under such conditions. Conventionally, they use a frictional clutch between the side gears and the differential casing. The frictional clutch may be selectively actuated by various hydraulic actuator assemblies, which are constructed of elements disposed inside the differential casing. Such differential assemblies are typically called limited slip differentials.

The hydraulic actuator assemblies of the limited slip differentials, as well as many other types of hydraulically actuated friction coupling have utilized internal gear sets, which are often called gerotors. Such devices can be used as pumps where rotational work is converted to hydraulic work. In the internal gear pumps, an inner gear having outwardly directed teeth cooperates with an external gear having inwardly directed teeth so that fluid chambers therebetween increase and decrease in volume as the inner and outer gears rotate in a housing. By connecting the inlet and outlet of the device to the proper location along the sides of the gear set, the variable displacement chambers receive and discharge hydraulic fluid so that the device can function as a pump or motor. A shaft or other mechanical device can be connected to either the inner or outer gear depending upon the type of device. The hydraulic actuator assemblies further include a hydraulic piston member for frictionally loading the friction clutch. The typical piston member of the prior art is housed in a pump housing insert having a finely machined sealing surface for receiving the hydraulic piston. Current hydraulic pistons are themselves expensive in manufacturing for they are provided with seals having delicate seal lips. The piston has to be assembled carefully in the housing insert in order to not damage the seal lips that makes such a device rather complex, expensive, laborious in assembly. Furthermore, the existing hydraulic actuators typically require a separate spring element providing an initial preload of the hydraulic piston.

SUMMARY OF THE INVENTION

The present invention provides an improved hydraulically actuated friction coupling.

The hydraulically actuated friction coupling in accordance with the present invention includes comprises a hollow case, at least one output shaft drivingly connected to the case, a friction clutch pack for selectively engaging and disengaging the case and the output shaft, and a hydraulic clutch actuator for selectively frictionally loading the clutch pack. The hydraulic actuator includes a hydraulic pump located within the case for generating a hydraulic pressure to frictionally load the clutch pack and a novel piston assembly disposed within the case between the pump and the clutch pack. The piston assembly includes an annular pressure plate adjacent to the pump, an annular thrust plate axially spaced from the pressure plate and adjacent to the clutch pack, and a pair of concentric radially spaced resilient annular seal members bonded to the pressure and thrust plates so as to define an enclosed annular cavity within the piston assembly. The pressure plate has one or more inlet openings theretrough for providing fluid communication between the annular cavity and a space within the differential case between the hydraulic pump and the piston assembly. The inlet opening is disposed adjacent to a discharge port of the pump. Preferably, the piston assembly is non-rotatably coupled to the differential case.

Preferably, the hydraulic pump is a gerotor pump disposed within the case and generating a hydraulic pressure in response to relative rotation between the case and the output shaft.

The friction clutch pack includes a number of alternating inner friction plates non-rotatably coupled to the output shaft, and outer friction plates non-rotatably coupled to the case. The friction clutch pack is axially loadable by the piston assembly to cause a frictional restriction of rotation of the output shaft relative to the case.

In accordance with the preferred embodiment of the present invention the hydraulically actuated friction coupling of the present invention is incorporated into a limited slip differential assembly comprising a differential case, a differential gear mechanism, a friction clutch pack and a hydraulic clutch actuator, as described hereinabove.

In operation, the pressurized hydraulic fluid, preferably an axle lubricant, generated in response to relative rotation between the differential case and the output shaft, enters the annular cavity through the inlet openings in the pressure plate. Under the pressure of the hydraulic fluid, the piston assembly expands axially by moving the thrust plate away from the pressure plate toward the clutch pack in the axial direction and presses the friction plates of the clutch pack so as to gradually bias the differential assembly. When the clutch pack is clutched, the relative rotation between the output axle shaft and the differential case is limited so that the differential rotation of the differential mechanism is limited.

Therefore, the hydraulically actuated friction coupling in accordance with the present invention uses less space within the case, eliminates the need for a separate piston housing, seal lips and a separate spring element providing an initial preload of the hydraulic piston of the prior art, and, thus, is simple, compact, and less expensive and laborious in manufacturing than existing hydraulically actuated friction couplings.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
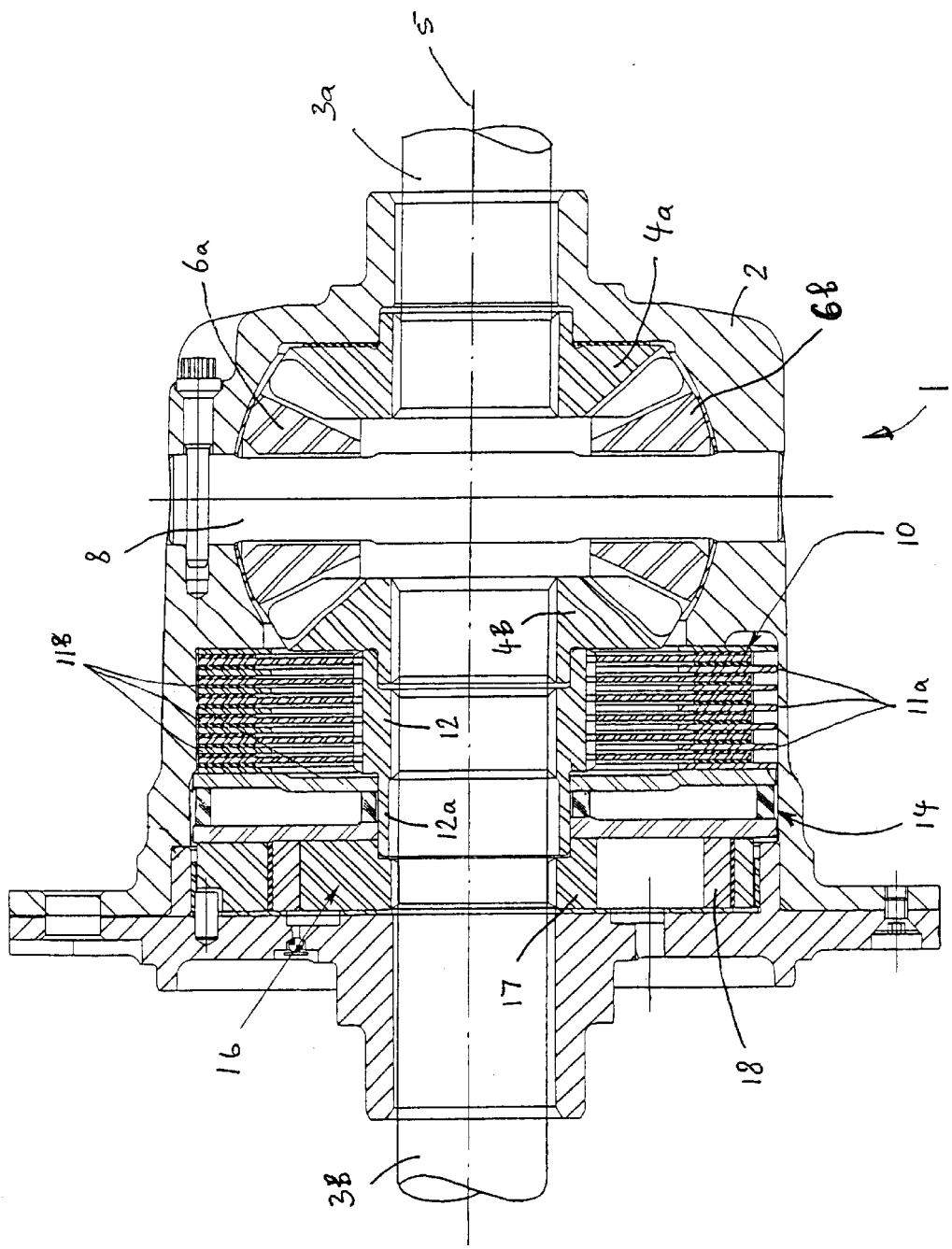
FIG. 1 is a sectional view of a limited slip differential assembly in accordance with the present invention.

Referring first to FIG. 1 of the drawings, a limited slip differential (LSD) assembly 1 in accordance with the present invention is illustrated. However, it is to be understood that while the present invention is described in relation to a speed sensitive limited slip differential, the present invention is equally suitable for use in other hydraulically actuated friction couplings, such as torque coupling mechanisms for a drive-train utilizing a speed sensitive limited slip device.

Reference numeral 2 defines a differential case rotatably supported in a differential housing (not shown), and defines an axis of rotation 5. The differential case 2 is driven by a ring gear (not shown) houses a pair of side gears 4a and 4b, and a set of pinion gears 6a and 6b rotatably supported on a pinion shaft 8 allowing speed differential between a pair of opposite output shafts 3a and 3b as is commonly known in the art. The side gears 4a and 4b are splined to the output axle shafts 3a and 3b. Disposed adjacent the side gear 4b is a clutch sleeve 12 drivingly coupled to the associated axle shaft 3b.

A limited slip device in the form of a clutch pack 10 is provided within the differential case 2. The friction clutch pack 10, well known in the prior art, includes sets of alternating outer friction plates 11a and inner friction plates 11b. Conventionally, an outer circumference of the outer friction plates 11a is provided with projections that non-rotatably engages corresponding grooves formed in the differential case 2. Similarly, an inner circumference of the inner friction plates 11b is provided with projections that non-rotatably engage corresponding grooves formed in the clutch sleeve 12, which in turn is splined to the associated axle shaft 3b. At the same time, both the outer friction plates 11a and the inner friction plates 11b are slideable in the axial direction. The clutch plates 11a frictionally engage the clutch plates 11b to form a torque coupling arrangement between the differential case 2 and a differential gear set formed by the pinion gears 6a, 6b and side gears 4a, 4b. Torque is transferred from a ring gear (not shown) to the differential case 2, which drives the pinion shaft 8 and the differential gear set. A hydraulic pump 16 disposed within the differential case 2 actuates the clutch pack 10 when the relative rotation between the differential case 2 and the output axle shaft 3b occurs. It will be appreciated that a hydraulic pressure generated by the pump 16 is substantially proportional to a rotational speed difference between the differential case 2 and the output axle shaft 3b. Preferably, a gerotor pump 16 is employed to provide pressurized hydraulic fluid to actuate the clutch pack 10. The gerotor pump 16 includes an impeller or inner rotor 17, which in turn is drivingly coupled to the output axle shaft 3b, and an internal ring gear 18 mounted by the differential case 2 for rotation eccentrically with respect to the toothed impeller 17 and including a plurality of internal teeth of a number that is one more than the impeller teeth and which are in a meshing relationship with the impeller teeth to provide a pumping action upon relative rotation between the casing and the toothed impeller. However, it will be appreciated that any other appropriate type of hydraulic pump generating the hydraulic pressure in response to the relative rotation between the differential case 2 and the output axle shaft 3b is within the scope of the present invention.

A hydraulically actuated annular piston assembly 14 is disposed within the differential case 2 between the hydraulic pump 16 and the clutch pack 10 in an axial direction, and between an outer surface of a boss portion 12a of the clutch sleeve 12 and the differential case 2 in a radial direction. Furthermore, the piston assembly 14 is coaxial to the axis 5. The piston assembly 14 is moveable in the axial direction and serves to compress the clutch pack 10 and retard any speed differential between the side gear 4b and the differential case 2. This results in a retardation of any speed differential between the shafts 3a, 3b. In such an arrangement, as the relative speed between the output shafts 3a, 3b increases, the gerotor pump 16 generates fluid pressure to the piston assembly 14 to actuate the clutch pack. 10.

Figure 2:
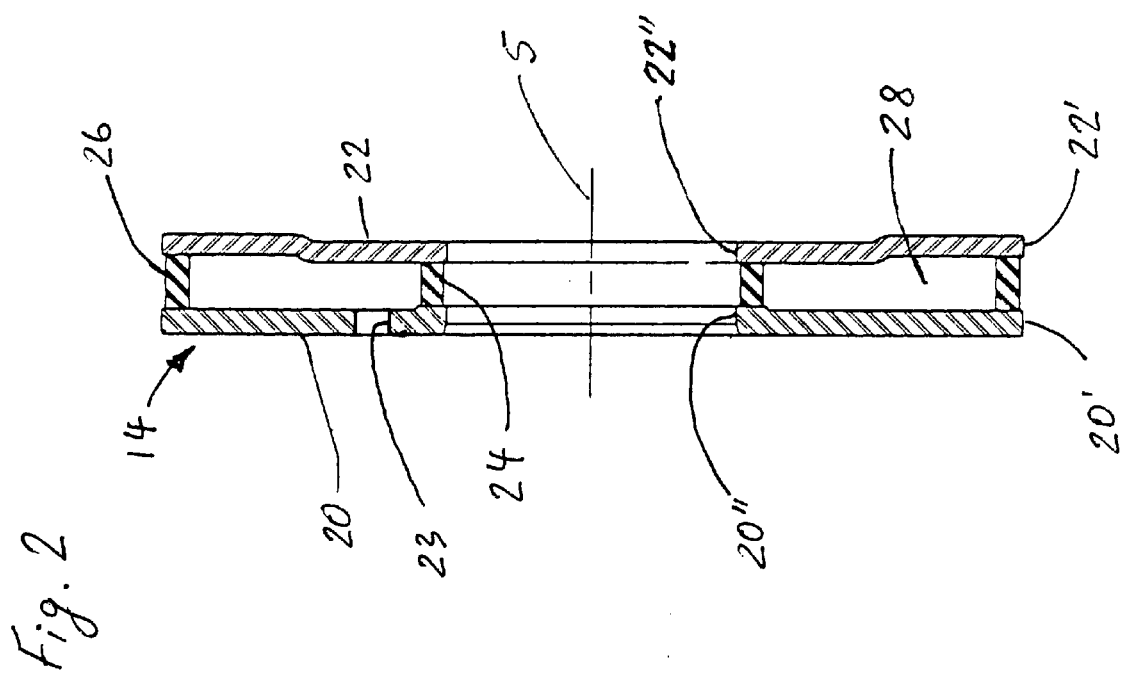
FIG. 2 is a sectional view of a piston assembly of a hydraulic actuator in accordance with the present invention.

The annular piston assembly 14 in accordance with the present invention is shown in detail in FIG. 2. As illustrated, the piston assembly 14 is substantially annular in shape, and comprises a substantially annular pressure plate 20 abutting the gerotor pump 16, and a substantially annular thrust plate 22 axially spaced from the pressure plate 20 and abutting the clutch pack 10. The pressure plate 20 has an outer edge 20' and an inner edge 20". Similarly, the thrust plate 22 has an outer edge 22' and an inner edge 22". Preferably, inner and outer diameters of the annular pressure plate 20 and thrust plate 22 are substantially equal.

The annular piston assembly 14 further includes a pair of resilient annular seal members 24 and 26 concentrically disposed between the pressure plate 20 and the thrust plate 22, and bonded thereto, such as by means of an adhesive, so as to define an annular cavity 28 within the piston assembly 14. Preferably, the first resilient annular seal member 24 is bonded to the plates 20 and 22 adjacent to the inner edges 20" and 22" thereof. Similarly, the second resilient annular seal member 26 is bonded to the plates 20 and 22 adjacent to the outer edges 20' and 22' thereof.

Figure 3:
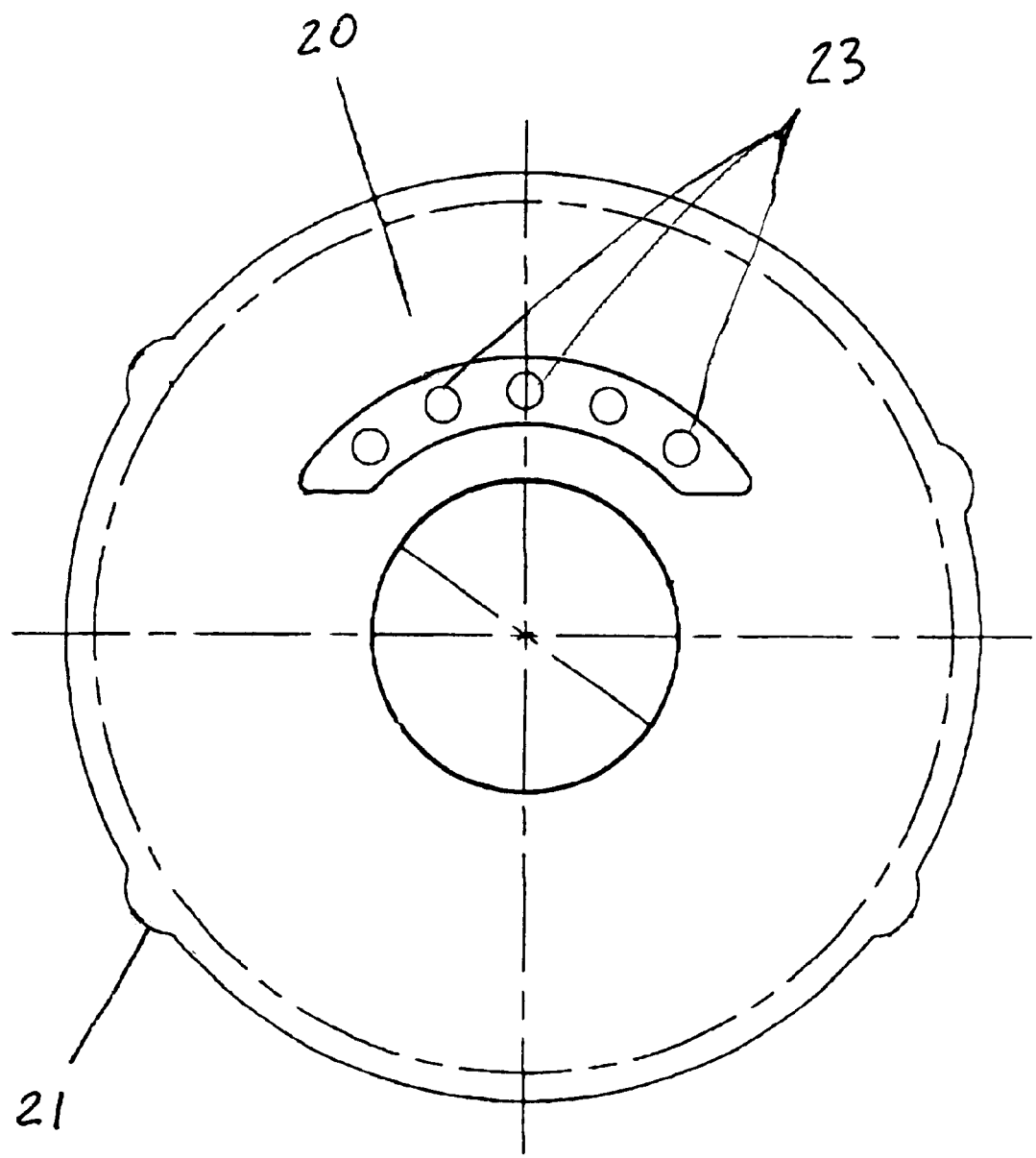
FIG. 3 is a rear view of the piston assembly of the hydraulic actuator in accordance with the present invention.

Moreover, as shown in FIGS. 2 and 3, the pressure plate 20 has one or more inlet openings 23 theretrough for providing fluid communication between the annular cavity 28 within the piston assembly 14 and a space within the differential case 2 between the gerotor pump 16 and the piston assembly 14. In the exemplary embodiment of the present invention illustrated in FIG. 3, the pressure plate 20 is provided with five circular inlet openings 23. It will be appreciated, that any other number of through openings in the pressure plate 20, is within the scope of the present invention. Likewise, the inlet opening 23 may be of any appropriate shape, such as kidney-shaped.

Preferably, the inlet opening 23 is disposed adjacent to a discharge port of the gerotor pump 16. In order to locate the inlet openings 23 in this particular position, the pressure plate 20 is provided with one or more key members adapted to non-rotatably engage corresponding grooves formed in the differential case 2. As illustrated in FIG. 3, four circumferentially spaced key members 21 are provided. Alternatively, the thrust plate 22 or both the pressure plate 20 and the thrust plate 22 may be provided with one or more key members for non-rotatably engaging corresponding grooves formed in the differential case 2. Those skilled in the art will appreciate that the piston assembly 14 may be non-rotatably coupled to the differential case 2 in any appropriate way well known in the art, such as spline joint, key joint, etc.

One of the functions of the resilient seal members 24 and 26 may be providing an initial preload of the piston assembly 14, thus eliminating the need for a separate spring element present in the conventional hydraulic friction clutch actuators, such as plate spring or wave spring.

In comparison to the current arrangements of the hydraulic actuators for the friction couplings, the piston assembly 14 of the present invention uses less space within the differential case, and eliminates the need for a separate piston housing having a finely machined sealing surface for receiving a hydraulic piston, seal lips and a separate spring element providing an initial preload of the hydraulic piston of the prior art. Therefore, the limited slip differential of the present invention is less expensive and laborious in manufacturing than existing hydraulically actuated friction couplings.

The limited slip differential of the present invention operates as follows: as long as the two output shafts 3a, 3b rotate at the same speed, there will be no hydraulic pressure generated by the gerotor pump 16. If, however, as a result of lost surface contact one of the two output shafts 3a, 3b begins to rotate faster than the other shaft. Thus, the relative rotation between the differential case 2 and the output axle shafts 3b occurs, the gerotor pump 16 is activated and generates the pressurized hydraulic fluid. The pressurized hydraulic fluid, preferably an axle lubricant, enters the annular cavity 28 through the inlet openings 23 in the pressure plate 20. Under the pressure of the hydraulic fluid, the piston assembly 14 expands axially by moving the thrust plate 22 away from the pressure plate 20 toward the clutch pack 10 in the axial direction. As the hydraulic pressure continues to build-up in the annular cavity 28 within the piston assembly 14, the piston assembly 14 moves further toward the clutch pack 10 and presses the friction plates 11a and 11b so as to gradually lock the differential assembly 1. When the clutch pack 10 is clutched, the relative rotation between the output axle shaft and the differential case 2 is limited so that the differential rotation of the differential mechanism is limited.

Therefore, a hydraulically actuated friction coupling in accordance with the present invention in the form of a limited slip differential assembly in accordance with the present invention includes a novel piston assembly that uses less space within a differential case, eliminates the need for a separate piston housing having a finely machined sealing surface for a hydraulic piston, seal lips and a separate spring element providing an initial preload of the hydraulic piston of the prior art, and, thus, is simple, compact, and less expensive and laborious in manufacturing than existing hydraulically actuated friction couplings.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A hydraulically actuated friction coupling comprising:
   a hollow case to be rotated by an outside drive torque;
   at least one output shaft drivingly connected to said case;
   a frictional clutch pack for selectively engaging and disengaging said case and said output shaft, said clutch pack comprising at least one first member coupled to rotate with said at least one output shaft and at least one second member coupled to rotate with said case, said members being frictionally engageable with one another;
   a hydraulic clutch actuator for selectively frictionally loading said clutch pack, said actuator comprising:
      a hydraulic pump for generating a hydraulic pressure to frictionally load said clutch pack;
      a piston assembly disposed within said case between said pump and said clutch pack, said piston assembly including a pressure plate adjacent to said hydraulic pump and a thrust plate axially spaced from said pressure plate and adjacent to said clutch pack, said plates fixed to each other through a pair of concentric radially spaced resilient annular seal members so as to define an annular cavity within said piston assembly,
      wherein said annular cavity is in fluid communication with an outlet port of said hydraulic pump.

2. The hydraulically actuated friction coupling as defined in claim 1, wherein said pressure plate has at least one opening therethough for providing the fluid communication with said outlet port of said hydraulic pump.

3. The hydraulically actuated friction coupling as defined in claim 2, wherein said at least one opening is disposed adjacent to said output port of said hydraulic pump.

4. The hydraulically actuated friction coupling as defined in claim 1, wherein said piston assembly is non-rotatably coupled to said case.

5. The hydraulically actuated friction coupling as defined in claim 1, wherein said pressure plate abuts said hydraulic pump and said thrust plate abuts said clutch pack.

6. The hydraulically actuated friction coupling as defined in claim 1, wherein said hydraulic pump is disposed within said case and generates a hydraulic pressure in response to relative rotation between said case and said at least one output shaft.

7. The hydraulically actuated friction coupling as defined in claim 6, wherein said hydraulic pump includes an impeller drivingly coupled to said at least one output shaft and an inner ring gear mounted by said case for rotation eccentrically with respect to said impeller to provide a pumping action upon relative rotation between said case and said impeller.

8. The hydraulically actuated friction coupling as defined in claim 7, wherein said hydraulic pump is a gerotor pump.

9. The hydraulically actuated friction coupling as defined in claim 1, wherein said friction coupling is part of a limited slip differential assembly.

10. The hydraulically actuated friction coupling as defined in claim 1, wherein said friction clutch pack includes a plurality of alternating inner friction plates non-rotatably coupled to said output shaft, and outer friction plates non-rotatably coupled to said case, said friction clutch pack is axially loadable by said piston assembly to cause a frictional restriction of rotation of said output shaft relative to said case.

11. A hydraulically actuated friction coupling in a limited slip differential assembly, said differential assembly comprising:
   a differential case rotatably supported in a differential housing and defining an axis of rotation;
   two output shafts outwardly extending from said case in an axial direction and drivingly connected to said case;
   a frictional clutch pack for selectively engaging and disengaging said case and said output shafts, said clutch pack comprising at least one first member coupled to rotate with one of said output shafts and at least one second member coupled to rotate with said case, said members being frictionally engageable with one another;
   a hydraulic clutch actuator for selectively frictionally loading said clutch pack, said actuator comprising:
      a hydraulic pump located within said differential case for generating a hydraulic pressure in response to relative rotation between said differential case and one of said output shafts to frictionally load said clutch pack;
      a piston assembly disposed within said case between said pump and said clutch pack, said piston assembly including a substantially annular pressure plate adjacent to said pump and a substantially annular thrust plate axially spaced from said pressure plate and adjacent to said clutch pack, said plates fixed to each other through a pair of concentric radially spaced resilient annular seal members so as to define an annular cavity within said piston assembly,
      wherein said annular cavity is in fluid communication with an outlet port of said hydraulic pump.

12. The hydraulically actuated friction coupling as defined in claim 11, wherein said pressure plate has at least one opening therethough for providing the fluid communication with said outlet port of said hydraulic pump.

13. The hydraulically actuated friction coupling as defined in claim 12, wherein said at least one opening is disposed adjacent to said output port of said hydraulic pump.

14. The hydraulically actuated friction coupling as defined in claim 11, wherein said piston assembly is non-rotatably coupled to said differential case.

15. The differential assembly as defined in claim 11, wherein said pressure plate abuts said hydraulic pump and said thrust plate abuts said clutch pack.

16. The hydraulically actuated friction coupling as defined in claim 11, wherein said hydraulic pump is disposed within said differential case and generates a hydraulic pressure in response to relative rotation between said differential case and one of said output shafts.

17. The differential assembly as defined in claim 16, wherein said hydraulic pump includes an impeller drivingly coupled to one of said output shafts and an inner ring gear mounted by said differential case for rotation eccentrically with respect to said impeller to provide a pumping action upon relative rotation between said differential case and said impeller.

18. The differential assembly as defined in claim 17, wherein said hydraulic pump is a gerotor pump.

19. The differential assembly as defined in claim 11, wherein said friction clutch pack includes a number of alternating inner friction plates non-rotatably coupled to one of said output shafts and outer friction plates non-rotatably coupled to said differential case, said friction clutch pack is axially loadable by said piston assembly to cause a frictional restriction of rotation of said output shafts relative to said differential case.

20. A hydraulically actuated friction coupling in a limited slip differential assembly, said differential assembly comprising:
   a differential case rotatably supported in a differential housing and defining an axis of rotation;
   two output shafts outwardly extending from said case in an axial direction and drivingly connected to said case;
   a friction clutch pack for selectively engaging and disengaging said case and said output shafts, said clutch pack comprising a number of alternating inner friction plates non-rotatably coupled to one of said output shafts and outer friction plates non-rotatably coupled to said differential case, said friction plates being frictionally engageable with one another;
   a hydraulic clutch actuator for selectively frictionally loading said clutch pack, said actuator comprising:
      a gerotor pump located within said differential case for generating a hydraulic pressure in response to relative rotation between said differential case and one of said output shafts to frictionally load said clutch pack;
      a piston assembly non-rotatably disposed within said case between said pump and said clutch pack, said piston assembly including a substantially annular pressure plate abutting said pump and a substantially annular thrust plate axially spaced from said pressure plate and abutting said clutch pack, said plates fixed to each other through a pair of concentric radially spaced resilient annular seal members so as to define an annular cavity within said piston assembly, said piston assembly is provided for frictionally loading said friction clutch pack to cause a frictional restriction of rotation of said output shafts relative to said differential case,
      wherein said pressure plate has at least one opening therethough disposed adjacent to an output port of said hydraulic pump for providing a fluid communication between said outlet port of said hydraulic pump and said annular cavity within said piston assembly, and
      wherein said piston assembly is non-rotatably coupled to said differential case.

* * * * *